INVENTORS
ARDEN L. MUNSON
JAMES ARTHUR HIRSCH
BY Robert Levine
ATTORNEY

INVENTORS
ARDEN L. MUNSON
JAMES ARTHUR HIRSCH
BY
ATTORNEY

Oct. 18, 1966  A. L. MUNSON ETAL  3,279,521
CONTROL MEANS FOR A FUEL BURNING SYSTEM
Filed Nov. 17, 1965  3 Sheets-Sheet 3

| CAM | CONTACT | FUNCTION | 0 | 10 | 20 | 30 | 40 | 50 | 60 | 70 | 80 | 90 |
|---|---|---|---|---|---|---|---|---|---|---|---|---|
| 72 | 81 | HEAT RELAY | ■ | | | | | | | | | ■ |
| | 70 | TIMER MOTOR | ████████████████████████████████████████ |
| 74 | 83 | BURNER MOTOR | | | | | | | | | ████ | |
| 73 | 71 | TIMER MOTOR | | | | | | | | | | ██ |
| | 82 | BURNER MOTOR | | ████████████████████████████████ | | |
| 75 | 78 | CHECK | | | | | | | | | ███ | |
| | 79 | OIL VALVE | | ████████████████████████████████████ | |

SECONDS

FIG. 4

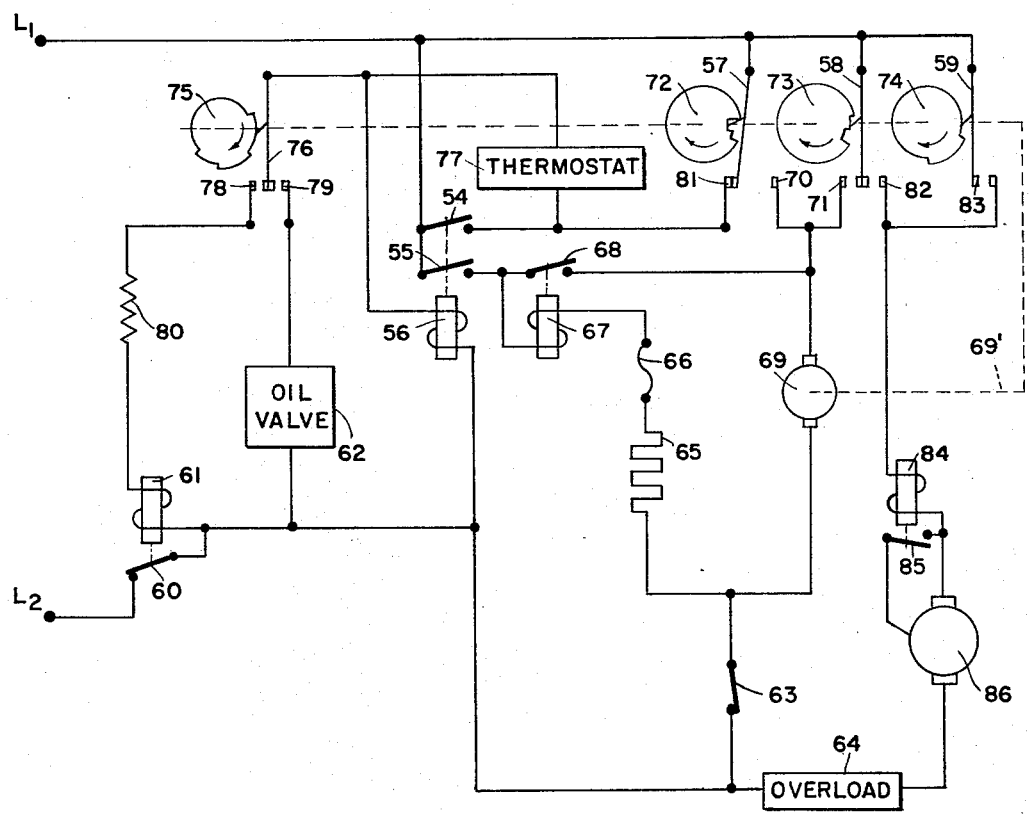

FIG. 5

INVENTORS
ARDEN L. MUNSON
JAMES ARTHUR HIRSCH
BY
Robert Levine
ATTORNEY

United States Patent Office 3,279,521
Patented Oct. 18, 1966

3,279,521
CONTROL MEANS FOR A FUEL BURNING
SYSTEM
Arden L. Munson, Logansport, and James A. Hirsch, Indianapolis, Ind., assignors to P. R. Mallory & Co., Inc., Indianapolis, Ind., a corporation of Delaware
Filed Nov. 17, 1965, Ser. No. 508,290
13 Claims. (Cl. 158—28)

The present invention relates to fuel burning systems and more particularly to the means and method for providing a control means for fuel burning systems.

Most present day fuel burning systems utilize a combination of bimetallic devices for controlling elements of the system. A typical bimetallic device has a laminated metallic strip composed of two different metals, each having a different temperature coefficient of expansion. When subjected to a temperature change, the aforementioned strip will deflect to open or close a circuit. A thermostat for controlling a home heating furnace is a typical example of a bimetallic device.

Although bimetallic devices have been used for many years, they have several drawbacks. One of the drawbacks is that bimetallic devices age and drift with time and usage and, consequently, do not always open or close at the optimum time. Another drawback is that contact wear on a bimetallic device has a considerable bearing on the timing characteristics of the devices. In general, bimetallic devices are considered to be unreliable.

As fuel burning systems are improved or are made more sophisticated, bimetallic devices do not provide the necessary control features which are required. For instance, oil burning systems presently being tested use very high pressures to vaporize the oil before it is ignited in order to develop a flame temperature which approaches that of natural gas. In many cases the oil is being broken down to a particle size less than 10 microns before ignition. Such systems require a carefully executed program for ignition, burning, and purging. Also, if ignition is not obtained in a predetermined time, provisions must be made for de-energizing the system in a fail safe condition.

Accordingly, the present invention provides a novel, efficient, safe, and economical solution to the control requirements of fuel burning systems. There is presented herein a control means for a fuel burning system. The control means includes a timer having a plurality of electrical output means for controlling elements of the fuel burning system. The timer shown in the illustrative embodiment of this specification is a motor driven timer having a plurality of cam-operated switches connected to elements of the fuel burning system. The timer is started by the igniting means for the fuel burning system when the igniting means is ready for ignition. The igniting means is energized through a relay and a thermostat. There is a means for stopping the timer when combustion is obtained and for restarting the timer when combustion is lost. In the illustrative embodiment of this specification the means for stopping and restarting the timer is a flame switch which may be a photoelectric device having a nonconducting state in the presence of a flame and conducting state when out of the presence of a flame.

The control means of the present invention can be expanded by the addition of more electrical output means for controlling elements of the fuel burning system. Thus, within the boundaries of the present invention, a wide variety of complex control systems can be derived. It is to be noted that the present invention resides in the means and method for starting, stopping, and restarting the timer as well as using a timer to control elements of a fuel burning system.

The control means of the present invention is very flexible in that the timer can be tailored to each fuel burning application. More electrical output means can be added and the time sequencing can be easily changed. A motor driven timer can be adapted to handle extremely high currents in a relatively small space. There is no problem, for instance, in operating a one-half horsepower motor directly from the switches on the timer.

The control means of the present invention is safer than a control means utilizing bimetallic devices for control functions. The present invention provides a rigidly controlled programmed ignition with timing to the nearest second. There is an established program which will never vary. The burning system will always start from the same condition each time there is ignition and there will always be a purge period each time there is a try for combustion.

A safety feature of the control means of the present invention is that the timer will always start in the position it was in when it stopped. Thus, a loss of power which is subsequently regained will cause the timer to complete a programmed cycle to fail safe the burning system.

Other features of the control means of the present invention will become apparent as this specification continues.

It is an object of the present invention, therefore, to provide a novel, safe, economical, and practical control means for fuel burning systems.

It is another object of the present invention to provide a control means for a fuel burning system wherein a timer is used to control the elements of said fuel burning system.

It is another object of the present invention to provide a control means for a fuel burning system wherein there is a timer for controlling elements of said system and a means for starting said timer when an igniting means is ready for ignition, a means for stopping said timer when combustion is obtained, and a means for restarting said timer when combustion is lost.

It is another object of the present invention to provide a motor driven timer having a plurality of cam-operated switches for controlling elements of a fuel burning system.

It is another object of the present invention to provide a control means for a fuel burning system wherein there is a positive means for de-energizing said system if combustion is not obtained after a predetermined time.

It is another object of the present invention to provide a control means for a fuel burning system wherein there is a relay means for de-energizing said system if combustion is not obtained and a means for checking the integrity of said relay means when said system is initially energized.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which:

FIGURE 4 is a second time-sequence chart for another embodiment of the programmed ignition system of the present invention.

FIGURE 5 is a schematic diagram that corresponds with the time-sequence chart shown in FIGURE 4.

Generally speaking the present invention resides in a fuel burning system and is a control means comprising: a time having a plurality of cam-operated switches for controlling elements of said system; a means for igniting a combustible material within said fuel burning system; a means for starting said timer when said igniting means is in a predetermined state, said starting means being coupled to said timer and to said igniting means; and a means for stopping said timer when combustion is obtained and for restarting said timer when combustion is lost, said restarting and stopping means being coupled to said timer.

Figure 1:
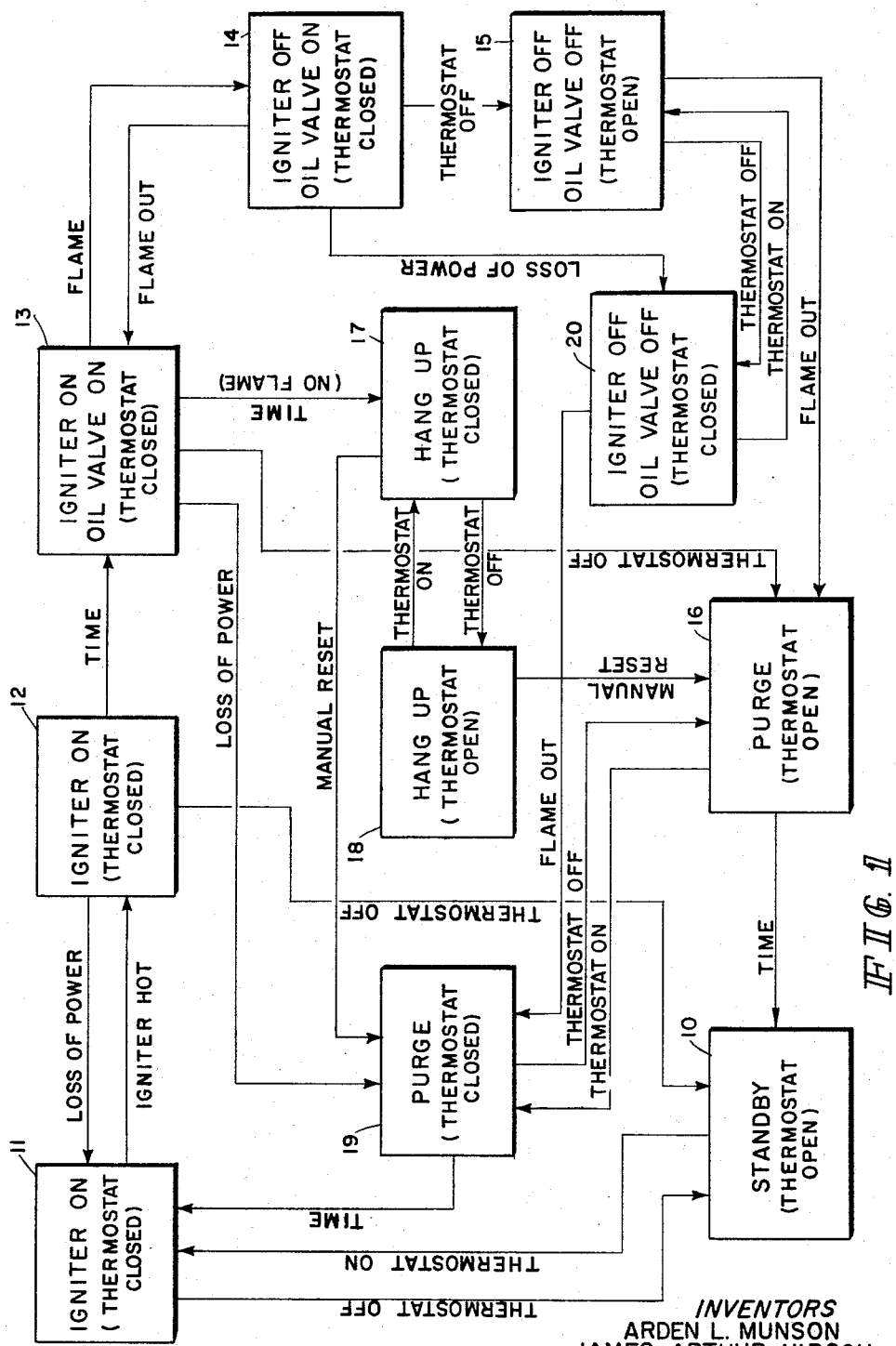
FIGURE 1 is a state diagram for the programmed ignition system of the present invention.

Referring now to the drawing, and particularly to the state diagram of FIGURE 1, the component parts of the present invention and their functions can be visualized in conjunction with the following description. There are eleven states which are defined for the programmed ignition system. They are shown as states 10 through 20 in FIGURE 1 and are as follows:

10—Standby _____ Thermostat Open.
11—Igniter On _____ Thermostat Closed.
12—Igniter On _____ Thermostat Closed.
13—Igniter On, Oil Valve On _____ Thermostat Closed.
14—Igniter Off, Oil Valve On _____ Thermostat Closed.
15—Igniter Off, Oil Valve Off _____ Thermostat Open.
16—Purge _____ Thermostat Open.
17—Hang Up _____ Thermostat Closed.
18—Hang Up _____ Thermostat Open.
19—Purge _____ Thermostat Closed.
20—Igniter Off, Oil Valve Off _____ Thermostat Closed.

A state, as used in this specification, is a combination of conditions of the heat relay, thermostat, flame switch, and timer with a unique state as destination for a given change of variables. Thus, the state diagram of FIGURE 1 shows how the programmed ignition system progresses from state to state as it passes through normal operation with usual and unusual switching of inputs. The various states 10 through 20 will be discussed further in an operational analysis of the present invention.

Figure 2:
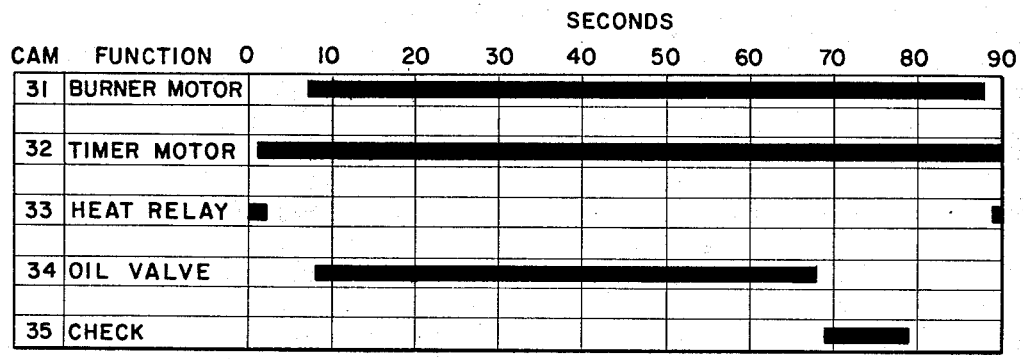
FIGURE 2 is a time-sequence chart for one embodiment of the programmed ignition system of the present invention.

Referring now to FIGURE 2 a time-sequence chart for one embodiment of the present invention can be discussed. As shown in the chart, the timer operates for 90 seconds. The cam-operated switches of the timer energize and de-energize the burner motor, timer motor, heat relay, and oil valve and establishes a check period during portions of the 90 second cycle. The times shown on the chart of FIGURE 1 can be changed as required in order to obtain optimum system operation.

Figure 3:
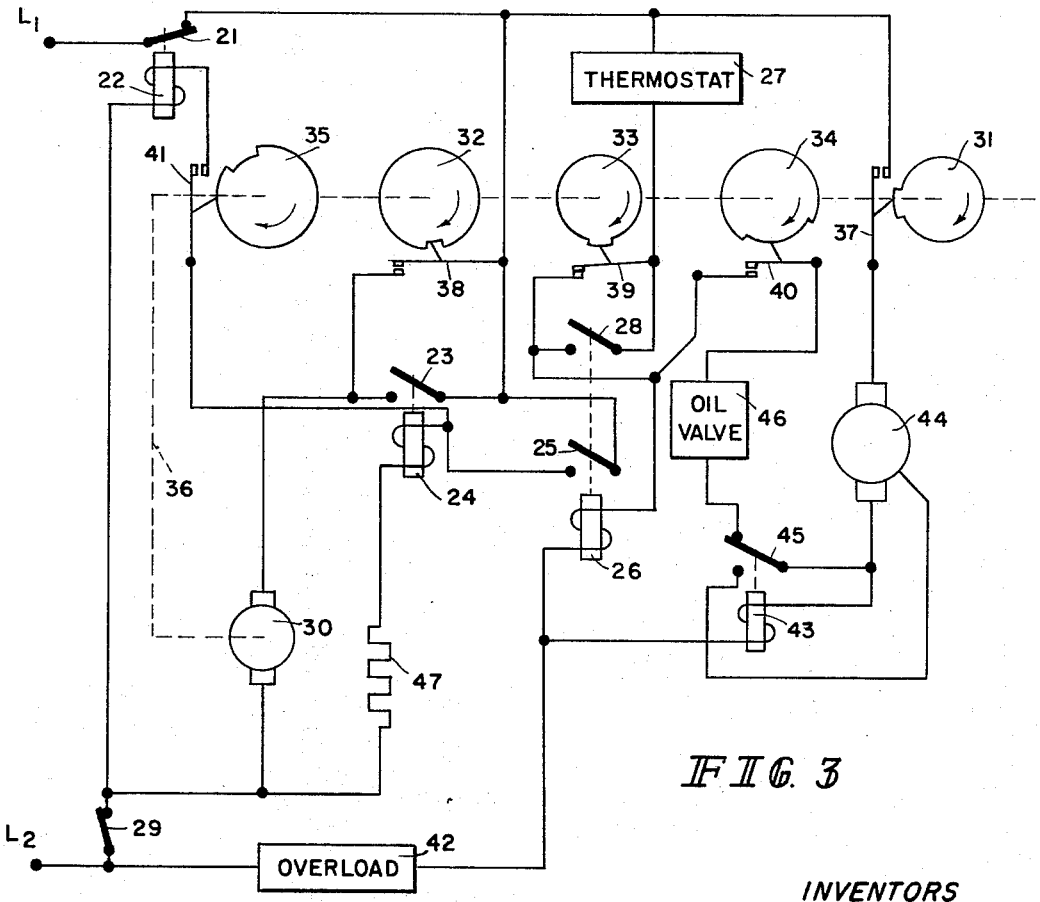
FIGURE 3 is the schematic diagram that corresponds with the time-sequence chart shown in FIGURE 2.

Referring now to FIGURE 3, a schematic of the embodiment that corresponds to the time-sequence chart of FIGURE 2 can be discussed. The electrical inputs to the programmed ignition system are provided through L1 and L2 which will be referred to as the line. L1 is connected directly to the contact 21 of the trip relay 22, and through contact 21 to the contact 23 of the igniter relay 24, to the contact 25 of the heat relay 26, and to a first side of the thermostat 27. The second side of the thermostat 27 is connected to the contact 28 of the heat relay 26. L2 is connected to a flame switch 29 and through said flame switch to a first side of the timer motor 30 and to the coil of the trip relay 22. There is a first cam 31, second cam 32, third cam 33, fourth cam 34, and fifth cam 35 mounted on a camshaft 36 which is rotated at a constant speed by the timer motor 30. Each of the cams 31 through 35 has a cam-operated switch associated therewith. The cam 31 operates a switch 37, the cam 32 operates a switch 38, the cam 33 operates a switch 39, the cam 34 operates a switch 40, and the cam 35 operates a switch 41. L2 is also connected to an overload 42 and through said overload to the coil of a motor starting relay 43 and through said coil to a first side of a motor operated pump, hereinafter referred to as a burner motor 44. The motor starting relay 43 operates a contact 45 which connects the first side of the burner motor 44 to an electrically operated oil valve 46 and through said oil valve to the switch 40 operated by the cam 34. The switch 40 is connected to the heat relay 26. The second side of the timer motor 30 is connected to the switch 38 operated by the cam 32 and to the normally open contact 23 of the igniter relay 24. There is an igniter means, which can be a silicon carbide igniter 47 coupled between the igniter relay 24 and the flame switch 29 and through said flame switch to L2. The second side of the burner motor 44 is connected to the switch 37 operated by the cam 31. The switch 41 operated by the cam 35 is connected between the trip relay 22 and the igniter relay 24.

Referring now to FIGURE 4, we see a time sequence chart for the embodiment of the programmed ignition system shown in FIGURE 5. The purpose of the chart is to show the operation of each of the cams used in the embodiment. This chart will be explained further in an operational analysis of the programmed ignition system.

Referring now to FIGURE 5, we see a schematic of the embodiment of the programmed ignition system corresponding to the time-sequence chart of FIGURE 4. The electrical input to the circuitry is provided by L1 and L2 which represents an alternating current power source. L1 is connected to the contacts 54 and 55 of the heat relay 56 and to the moveable switch contacts 57, 58 and 59. L2 is connected to the contact 60 of the trip relay 61 and through said contact to the coil of the trip relay 61 and to a first side of the electrically operated oil valve 62. L2 is also connected through the contact 60 to the coil of the heat relay 56, the flame switch 63, and the overload 64. The flame switch 63 is connected to an igniter means 65 and through said igniter means and its fuse 66 to the coil of the igniter relay 67 which operates the contact 68. The flame switch 63 is also connected to the timer motor 69 and through said timer motor to the contacts 70 and 71. There are four cams 72, 73, 74 and 75 mounted on the camshaft 69' so as to be rotated by the timer motor 69. The cam 72 operates the moveable contact 57, the cam 73 operates the moveable contact 58, the cam 74 operates the moveable contact 59 and the cam 75 operates the moveable contact 76. The moveable contact 76 is connected to the coil of the heat relay 56 and to the thermostat 77 and makes contact with the contact 78 and 79 as the cam 75 rotates. There is a resistor 80 connected between the coil of the trip relay 61 and the contact 78. The contact 79 is connected to the electrically operated oil valve 62. The moveable contact 57 makes contact with the contacts 70 and 81 as the cam 72 is rotated. The moveable contact 58 makes contact with the contacts 71 and 82 as the cam 73 is rotated. The moveable contact 59 makes contact with the contact 83 as the cam 74 is rotated. The contacts 82 and 83 are connected to the coil of the motor starting relay 84 which operates the contact 85 and through said coil to the burner motor 86.

With the above description of components in mind, and by making reference to the drawing figures, the following analysis of operation will serve to convey the functional details of the present invention. As stated, previously, the present invention relates to a programmed ignition system for a furnace or the like. The illustrative embodiments of this specification provides a fail safe primary control of an oil burner. Obviously other fuel burning systems such as gas or gasoline systems, could be controlled in the same manner.

Referring now to FIGURE 3, it can be seen that the present invention utilizes a heat relay 26 between the program timer and the thermostat 27. The programmed timer consists of the timer motor 30, the cams 31 through 35, and the switches 37 through 41. The heat relay 26 checks to see that the timer is in the right mode for a try for fire and also that the overload 42 and the trip relay 22 are closed. At that point the heat relay 26 energizes the igniter means 47. When the current is initially applied to the igniter means 47, the resistance of the igniter means is high and the igniter draws a very low current for the applied voltage. As the igniter means 47 warms up, the resistance drops and the current increases. The igniter relay 24 is in series with the igniter means 47 and responds to the current corresponding to the ignition temperature to close the contact 23 which starts the timer motor 30. The timer is programmed for a try for fire period, check for fire period, and a purge period. The definitions of those periods will become more apparent as the specification progresses.

The oil valve 46 is maintained closed until the motor starting relay 43 indicates that the burner motor 44 is up to speed. When the motor starting relay 43 closes the contact 45, the oil valve 46 is opened to allow oil to flow into the burner. This is assuming that the switch 40 has been closed by the cam 34.

The try for fire period continues until the flame switch 29 opens to indicate that ignition has taken place. The try for fire period is a condition whereby the oil valve 46 is open, the burner motor 44 is running, and the igniter means 47 is at ignition temperature.

The burner will run in a normal condition until the thermostat 27 is satisfied. At that point, the thermostat 27 opens to de-energize the heat relay 26 and to close the oil valve 46. The burner motor 44 will continue to run to start the purge period, thereby removing the fuel from the burner system. When the flame switch 29 recloses, the timer motor 30 will start running and will continue to run until the purge conditions are met for a given burner. At the end of the purge period, the timer motor 30 drives the timer to a standby condition where the burner motor 44 and the timer motor 30 are turned off.

If the flame switch 29 has not opened in a specific time, the timer motor 30 will continue to run and the timer program will be advanced to a check for fire which will energize the trip relay 22 to open its contacts 21, thereby disabling all of the components in the system. Thus, a fail safe condition is created. When the trip relay 22 is closed manually, the timer motor 30 will be energized to resume the program commencing with the purge period. The heat relay 26 cannot be energized until this period is over. Also the oil valve 46 is maintained closed for the purge period.

If during the try for fire period, the flame switch 29 indicates ignition and then before the thermostat 27 is satisfied recloses to indicate a loss of fire, the timer motor 30, will start where it had left off in the program. When this happens the igniter means 47 will come on and the burner motor 44 and the oil valve 46 will remain on. If the oil does not ignite quickly, the check for fire portion of the program will be reached, the trip relay 22 will operate, and a fail safe condition will be achieved.

If the rotor locks on the burner motor 44, the overload 42 will remove both the motor 44 and the motor starting relay from the line thereby closing the oil valve 46 to assure that oil will not be introduced into a system that will not work. The heat relay 26 will also be de-energized by the opening of the overload 42.

A loss of power at any time after the timer motor 30 has started to run will cause the system to go to a purge condition. If the thermostat 27 is still calling for heat at the end of the purge period, there will be another try for fire period.

If the thermostat 27 is teased, opened and closed, during the igniter means 47 warm-up and the teasing is continued for 2 seconds after the timer motor 30 has started running, the system will switch to a purge mode for the remainder of the cycle. The 2 seconds time difference is shown in FIGURE 2 for cam 32 and 33.

Referring again to the state diagram of FIGURE 1, the time sequence chart of FIGURE 2, and the schematic of FIGURE 3, an understanding of the various states can be obtained.

The oil burner primary control cycle starts from a standby condition shown as box 10 in the state diagram of FIGURE 1. In the standby condition, the heat relay 26 contacts 25 and 28 are open, the contacts 37, 39, 40 and 41 are open, and the contact 39 is closed. (The contacts 37, 38, 39, 40, and 41 are associated respectively, with the cams 31, 32, 33, 34, and 35.) The flame switch 29, the trip relay contact 21, and the overload 42 are closed and the thermostat 27 is open. (The thermostat 27 is off when open and on when closed.)

A call for heat is accomplished by the thermostat 27 closing as the system progresses to the state shown in box 11 where the igniter means 47 is on. The closing of the thermostat 27 completes a circuit from L1 to L2 through the thermostat 27, the contact 39 associated with the cam 33, and the heat relay 26. When this happens, the heat relay 26 closes contact 25 and 28 to provide current to the igniter means 27. The heat relay 26 is held in an energized condition through the contact 28.

When the igniter means 47 is up to the ignition temperature, the current flowing through said igniter will energize the igniter relay 24 to close the contact 23 to energize the timer motor 30, thereby advancing the cam 32 to close the switch 38 and the cam 33 to open the switch 39. The state of the system will then correspond to that shown in the box 12.

The program will continue for a short period to assure that the igniter means 47 is hot enough to ignite the oil and to provide a pre-purge to clean the burner system. At the end of this time the cam 31 will close the switch 37 to energize the burner motor 44 and the cam 34 will close the switch 40. The energization of the burner motor 44 will energize the motor starting relay 43 to close the contact 45 to open the oil valve 46. The system will then correspond to the state shown in the box 13 where the igniter 47 is hot and the oil valve 46 is open.

As combustion takes place and the heat builds up, a point will be reached that will cause the flame switch 29 to open, thereby stopping the timer motor 30 and disconnecting the igniter 47. The system will then correspond to the state shown in the box 14 where the igniter 47 is off, the oil valve 46 is open, and the thermostat 27 is closed.

The burner motor 44 will keep running and the oil valve 46 will remain open until the thermostat 27 is satisfied. When the thermostat 27 is satisfied, it will open up to de-energize the heat relay 26 which will open the contact 25 and 28, thereby closing the oil valve 46. (The burner motor 44 will continue to run to purge the burner.) The system will then correspond to the state shown in the box 15 where the igniter 47 is off, the oil valve 46 is closed, and the thermostat 27 is open.

With the removal of the oil, the burner wil cool down so that the flame switch 29 can close. When this happens, the timer motor 30 will start and the program can continue. The timer motor 30 will continue to run to keep the burner motor 44 running to purge the system. The system will correspond to the state shown in the box 16.

At the end of the purge period, the cam 31 opens the switch 37 to de-energize the burner motor 44 and the cam 33 will close the switch 39 to return the system to the standby condition shown in the box 10.

It is important now to discuss the operation of the present invention in terms of switching the inputs in other than the normal sequence of operation and in terms of failure of the various components.

When the program is in either the state shown in the box 10 or in the state shown in the box 11, any voltage interruption before the switch 38 is closed by the cam 32 and the switch 39 is opened by the cam 33 will cause the heat relay 26 to drop out, thereby opening contacts 25 and 28. Reapplying the voltage will cause the heat relay 26 to be energized resuming the program.

If a voltage interruption occurs after the switch 38 is closed by the cam 32 and the switch 39 is opened by the cam 33, the heat relay 26 will drop out to open the contacts 25 and 28, the timer motor 30 will stop, and the igniter means 47 will be shut off. Reapplication of the voltage will cause only the timer motor 30 to run. Since the contact 28 was opened, the heat relay 26 cannot be energized. The program will, therefore, continue to run with only the burner motor 44 energized which is the state of continuous purge shown in the box 19 of FIGURE 1. Neither the oil valve 46 nor the igniter 47 can be energized during this period. If the thermostat 27 is still on, the program will go from the state shown in the box 19 to the state shown in the box 11. If the thermostat 27 is shut off, or opened, when the program is in the state shown in the box 13 and voltage is reapplied, the program will go from the state shown in the box 13 to the state shown in the box 19 and then to the state shown in the box 10.

If a voltage interruption occurs after the ignition takes place, the heat relay 26 will drop out to remove the oil valve 46 and the igniter 47 from the line. That is, the system will go from the state shown in the box 14 to the state shown in the box 20. A reapplication of voltage will cause the burner motor 44 to run. When the flame switch 29 recloses, the timer motor 30 will drive the timer through the purge program shown in the box 19. At the end of the purge program, if the thermostat 27 is still calling for heat (thermostat is closed), the program will move into a try for fire period which is the state shown in the box 11.

If the thermostat 27 is shut off during a loss of voltage, the system will go from the state shown in the box 20 to the state shown in the box 15, then the state shown in the box 16, and then to the state shown in the box 10.

A voltage interruption during the purge portion of the program (during the states shown in either the box 15 or 19) will cause the timer motor 30 and the burner motor 44 to resume the purge period.

When the system is in the state shown in the box 13 with the igniter 47 on and the oil valve 46 open and the flame switch 29 does not open to indicate ignition, the timer motor 30 will continue to run until the switch 41 is closed by the cam 35 to energize the trip relay 22 thereby opening the contact 21. When the contact 21 is open, the entire system is shut off and cannot be operated until the contact 21 is manually closed. When the flame switch 29 does not open as discussed above and the contact 21 is opened, the heat relay 26 will be de-energized and its holding contact 28 will be opened. Thus, resetting of the trip relay 22, contact 21, will only allow the timer motor 30 and burner motor 44 to run and the program will go into the purge state shown in the box 19. If the thermostat 27 is still closed (calling for heat) at the end of the purge period, the system will advance to the state shown in the box 11 for a try for heat.

If the thermostat 27 is opened and the flame switch 29 will not close, the system will go into the purge state shown in the box 16.

Each time the program does not get ignition, the system will be de-energized by the trip relay 22 opening the contact 21. The trip relay 22 has to be reset manually before the system can again be energized. Also, the trip relay 22 is designed so that the system cannot operate if the reset button attached to the contact 21 is held depressed. If the trip circuit is reset immediately, the system will still have to go through a purge period, which is the state shown in the box 19, before another try for fire can take place.

If the burner was to have a flame out condition take place, the flame switch 29 will reclose causing the timer motor 30 and the igniter 47 to be energized, thereby taking the system from the state shown in the box 14 to the state shown in the box 13. The trip relay 22 will then be energized by the closing of the switch 41 by the cam 35 to open the contact 21 which will take the system from the state shown in the box 13 to the state shown in the box 17.

The overload 42 is designed to provide locked rotor protection for the burner motor 44. The overload 42 is placed in the circuit so that its operation will cause the heat relay 26 to drop out. The overload 42 may be of the manual reset type, in which case the circuit is disabled until such time as the overload is reset, or the automatic type where the motor is "cycled on the overload" until such time that the overload 12 fails or the burner motor 44 is serviced. Since the heat relay 26 is deenergized by the overload 42, the oil valve 46, igniter 47, and the trip relay 22 will not be energized by the running of the timer motor 30.

If the thermostat 27 fails to open, the burner will continue to operate until a high temperature limit switch opens, a pressure valve opens, or the burner runs out of fuel. This is a problem with all burner control systems.

If the thermostat 27 fails to close, the burner system will not be energized since the heat relay 26 will be de-energized. Again, this is a problem with all burner control systems.

If the flame switch 29 fails to open, the system will go into a try for fire period and then into a check for fire period. After that the system will de-energize by the action of the cam 35 in closing the switch 41 to operate the trip relay 22.

If the flame switch 29 fails to close in the middle of a firing period and the thermostat is satisfied, the heat relay 26 will drop out and the system would continue to run indefinitely in a purge mode because the timer motor 30 cannot start until such time that the trouble is identified and corrected.

If the timer motor 30 failed to start initially, the igniter 47 would warm-up but the program would not start. If the timer motor 30 stopped anytime after the state shown in the box 12 but before the state shown in the box 13, the burner motor 44 and the igniter 47 would still be energized. If the timer motor 30 stopped at the state shown in either the box 13 or 14, the system would be left in a normal burning condition which will be detected by the flame switch. After the thermostat 27 is satisfied, the system would go into a continuous purge. If the timer motor 30 stops at the state shown in the box 16 or stops before the state shown in the box 10 is achieved, a continuous purge will be established. Likewise, if the timer motor 30 fails to start at the states shown in either the box 17, 18, 19 or 20, a continuous purge will be established upon resetting the trip relay 22 contact 21. It is to be noted that whenever the timer motor 30 fails and stops the heat relay 26 will drop out after the heat requirements are met unless the timer motor stops at the location where the switch 39 is closed, in which case oil will never flow because the oil valve 46 will be closed.

If the contact 25 of the heat relay 26 was to stick in a closed position, the igniter will remain on through the firing and purge cycle. The trip relay 22 will remain in an armed condition and when the cam 35 closes the switch 41, the trip relay 22, will open the switch 21. If the contact 28 sticks, the relay 26 will be inhibited from remaining de-energized with a loss of voltage and a reapplication of voltage. This will not be an unsafe condition because the thermostat 27 is in series with the heat relay 26 and the oil valve 46 circuits. Also, the trip relay 22 will protect against an unsafe condition.

If the contact 25 of the heat relay 26 fails to close, the igniter means 47 will not get hot, and consequently the igniter relay 24 will not be energized to start the timer motor 30. If the contact 28 of the heat relay 26 fails to close, the heat relay 26 cannot be held in after the switch 39 is allowed to open by the cam 33. In either case, the contacts 25 and 28 failing to close, safety is assured because the unit will fail to give heat.

If the burner motor 44 has a locked rotor or a running overload, the overload 42 will operate to remove the burner motor 44 from the line and to drop out the heat relay 26.

If the oil valve 46 sticks open, the thermostat 27 will open when it is satisfied and drop out the heat relay 26. Because the burner motor 44 will continue to run and the oil will continue to flow, the burning of the oil will not cease and the flame switch 29 will not reclose. As a result the burner system will continue to heat in a runaway state unless a temperature limit switch or some other safety means is provided. This is a problem with all burner systems.

In the discussion to this point it is obvious that the heat relay 26 is responsive to the thermostat 27 and is a means for energizing the igniter means 47 and for arming the trip relay 22. The igniter 47 is a means for igniting a combustible material which is introduced into the burner chamber. The igniter means may be a silicon carbide igniter as previously discussed, a spark gap supplied through an ignition transformer or other means. In some cases the igniter will be energized through a transformer which provides a lower voltage than the usual line voltage. The igniter relay 24 is responsive to the state of the igniter means 47 and is a means for energizing the timer motor 30 to start the programmed timing cycle. The flame switch 29 is a means for determining whether or not combustion has taken place and a means for stopping the timer motor 30 when combustion is obtained and for restarting the timer motor 30 when combustion is lost. The oil valve 46 is a means for admitting combustible material into the burner system. The burner motor 44 is a means for pumping combustible material into the burner system and a means for purging the burner system of combustible material. The timer motor 30, shaft 36, cams 31, 32, 33, 34 and 35, and switches 37, 38, 39, 40 and 41 comprise a timer means having a plurality of electrical output means for operating elements of a burner system. The thermostat 27 is a means for establishing a circuit condition for a predetermined temperature which will start and stop the burner system. In the illustrative embodiment of this specification the thermostat 27 is a means for energizing the heat relay 26. In many systems the thermostat is operated on the low voltage side of a transformer to provide a better temperature control differential. The burner motor 44 is a motor driven pump means for providing a mixture of oil and air to the fuel burning system and for purging said system.

Referring again to the schematic shown in FIGURE 5, an optional circuit approach to using a timer as a means to control elements of a burner system can be discussed. In this approach the thermostat 77 closes to energize the heat relay 56, thereby closing the contacts 54 and 55. The igniter means 65 is energized through the contact 55 and the igniter relay 67 is energized when the current through the igniter 65 is increased to a predetermined value. The timer motor 69 is energized through the contacts 68 which is closed by the igniter relay 67 and the contact 55 which is closed by the heat relay 56.

Referring to FIGURE 4 as well as FIGURE 5, it can be seen that one second after the timer motor 69 starts to run, the cam 72 permits the moveable contact 57 to break with the contact 81 and to make with the contact 70, thereby energizing the timer motor 69 directly from the line. After six seconds the cam 73 causes the moveable contact 58 to make with the contact 82 which energizes the burner motor 86. In one more second, the oil valve 62 is opened. At that time the try for fire will continue for 60 seconds or until the flame switch 63 opens. If the flame switch 63 opens, combustion will continue until the thermostat 77 is opened and the burner motor 86 will continue purging until the timer motor 69, which starts when the flame switch 63 closes, completes 88 seconds of its 90 second cycle.

If, due to teasing of the thermostat 77 contact, the heat relay 56 is de-energized before ignition, the igniter 65 will remain on through the contacts 68 of the igniter relay 67 and the contact 70 associated with the movable contact 57. This is a desirable situation because a hot igniter 65 will permit the next cycle to commence without the usual delay of waiting for the igniter to heat. On the other hand, if it is considered to be undesirable to have the igniter 65 continually heated, the igniter relay 67 may be moved to the other side of the heat relay 56 contacts 54 and 55.

The programmed ignition system of the present invention, as hereinbefore described in one of its embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. In a fuel burning system, a control means comprising: a timer having a plurality of cam-operated switches for controlling elements of said system; a means for igniting a combustible material within said fuel burning system; a means for starting said timer when said igniting means is in a predetermined state, said starting means being coupled to said timer and to said igniting means; a means for stopping said timer when combustion is obtained and for restarting said timer when combustion is lost, said restarting and stopping means being coupled to said timer, and means for de-energizing said system if combustion does not occur after a predetermined time, said de-energizing means being coupled to and operated by said cam-operated switches.

2. A control means as in claim 1 wherein said igniting means has a predetermined high resistance when voltage is initially applied at ambient conditions and a predetermined low resistance when voltage is applied at an ignition temperature, said predetermined low resistance permitting sufficient current flow to energize said means for energizing said timer.

3. A control means as in claim 1 wherein there is a relay for de-energizing said fuel burning system when combustion is not obtained, said relay having a coil connected to said timer so as to be energized after a predetermined time.

4. A control means as in claim 1 wherein there is a means for admitting a combustible material to said fuel burning system, said admitting means being coupled to said timer so as to be operated at a predetermined time.

5. A control means as in claim 1 wherein said means for energizing said timer is a relay having a coil connected in circuit with said igniting means so as to be energized when sufficient current can flow through said igniting means.

6. A control means as in claim 1 wherein said means for stopping said timer when combustion is obtained and for restarting said timer when combustion is lost is a photoelectric device having a nonconducting state in the presence of a flame and a conducting state when out of the presence of a flame.

7. A control means as in claim 1 wherein said means for stopping said timer when combustion is obtained and for restarting said timer when combustion is lost is a temperature responsive switch which is open in the presence of heat and which is closed when out of the presence of heat.

8. A control means as in claim 1 wherein there is a thermostat for establishing a circuit condition for a predetermined temperature and a means for energizing said igniting means in response to said circuit condition, said means being coupled to said thermostat and to said igniting means.

9. A control means as in claim 1 wherein there is a thermostat for establishing a circuit condition for a predetermined temperature and a relay for energizing said igniting means in response to said circuit condition, said relay being coupled to said thermostat and to said igniting means.

10. In a fuel burning system of the type having a thermostat means for establishing a circuit condition for a predetermined temperature, a control means comprising: a motor driven timer having a plurality of cam-operated switches for controlling elements of said system; a means for igniting combustible material within said fuel burning system; a means for energizing said igniting means when said thermostat establishes said circuit condition, said energizing means being connected to said thermostat and to said igniting means; a means for starting said timer when said igniting means is in a predetermined state, said starting means being coupled to said timer and to said igniting means; a means for stopping said timer when combustion is obtained and for restarting said timer when combustion is lost, said restarting and stopping means being connected to said timer; a means for de-energizing said fuel burning system if combustion does not occur after a predetermined time, said deenergizing means being coupled to and energized by said cam-operated switches; and a means for admitting a combustible material to said fuel burning system, said admitting means being connected to and energized by said cam-operated switches.

11. A control means as in claim 10 wherein said means for admitting a combustible material is an electrically operated oil valve, said oil valve being connected to and operated by said cam-operated switches.

12. A control means as in claim 10 wherein there is a motor driven pump means for providing a mixture of oil and air to said fuel burning system and for purging said system, said motor driven pump means being coupled to and energized by said cam-operated switch.

13. In a fuel burning system, a control means comprising: a motor driven timer having a plurality of cam-operated switches connected to elements of said system; an igniting means; means responsive to an energized state of said igniting means for starting said timer, said starting means being connected to said timer; means for admitting a combustible material to said fuel burning system, said admitting means being connected to and operated by said cam-operated switches; means for stopping said timer when combustion is obtained and for restarting said timer when combustion is lost, said restarting and stopping means being connected to said timer, and means for de-energizing said fuel burning system if combustion is not obtained after a predetermined time, said de-energizing means being connected to and operated by said timer.

References Cited by the Examiner

UNITED STATES PATENTS

| | | | |
|---|---|---|---|
| 2,095,253 | 10/1937 | Heyroth. | |
| 2,108,770 | 2/1938 | Kriechbaum | 158—28 |
| 2,484,602 | 10/1949 | Aubert | 158—28 |
| 2,989,117 | 6/1961 | Graves | 158—28 |
| 3,162,234 | 12/1964 | Hamelink | 158—28 |

JAMES W. WESTHAVER, *Primary Examiner.*